United States Patent
Dutta et al.

(10) Patent No.: US 9,680,968 B2
(45) Date of Patent: Jun. 13, 2017

(54) ESTABLISHING TRANSLATION FOR VIRTUAL MACHINES IN A NETWORK ENVIRONMENT

(71) Applicant: CISCO TECHNOLOGY, INC., San Jose, CA (US)

(72) Inventors: Debojyoti Dutta, Santa Clara, CA (US); Kyle A. D. Mestery, Woodbury, MN (US)

(73) Assignee: PATENT CAPITAL GROUP, San Jose, CA (US)

( * ) Notice: Subject to any disclaimer, the term of this patent is extended or adjusted under 35 U.S.C. 154(b) by 679 days.

(21) Appl. No.: 13/830,861

(22) Filed: Mar. 14, 2013

(65) Prior Publication Data
US 2014/0280997 A1    Sep. 18, 2014

(51) Int. Cl.
H04L 12/24    (2006.01)
H04L 29/06    (2006.01)
G06F 9/54    (2006.01)

(52) U.S. Cl.
CPC .............. H04L 69/03 (2013.01); G06F 9/541 (2013.01)

(58) Field of Classification Search
CPC .......... H04L 69/08; H04L 69/03; G06F 9/541
USPC ................................ 709/230, 231
See application file for complete search history.

(56) References Cited

U.S. PATENT DOCUMENTS

| 7,756,943 B1* | 7/2010 | Wong ..................... G06F 9/544 709/212 |
| 8,429,675 B1* | 4/2013 | Radhakrishnan ... G06F 9/45533 719/319 |
| 9,197,489 B1* | 11/2015 | Vincent ................. H04L 67/148 |
| 2012/0177039 A1* | 7/2012 | Berman ..................... 370/390 |
| 2012/0177044 A1* | 7/2012 | Berman ..................... 370/392 |
| 2012/0311568 A1* | 12/2012 | Jansen ................ G06F 9/45558 718/1 |
| 2013/0044764 A1* | 2/2013 | Casado ................... H04L 12/66 370/401 |
| 2013/0058252 A1* | 3/2013 | Casado et al. ............... 370/254 |
| 2013/0151685 A1* | 6/2013 | Bursell ........................ 709/223 |
| 2013/0297769 A1* | 11/2013 | Chang et al. ................. 709/224 |
| 2014/0223013 A1* | 8/2014 | Gaglianello et al. ......... 709/226 |
| 2014/0254603 A1* | 9/2014 | Banavalikar et al. ........ 370/401 |
| 2014/0269709 A1* | 9/2014 | Benny et al. ................ 370/392 |

OTHER PUBLICATIONS

Cisco Systems, Inc., "Cisco IP Solution Center: L2VPN User Guide, 4.1," Text Part No. OL-7644-01, retrieved and printed on Mar. 14, 2013, 254 pages (filed in two parts—Part 1 of 2, 127 pages; Part 2 of 2, 127 pages); http://www.cisco.com/en/US/docs/net_mgmt/ip_solution_center/4.1/l2vpn/user/guide/vlantran.html.

* cited by examiner

Primary Examiner — Ario Etienne
Assistant Examiner — Elizabeth Kassa
(74) Attorney, Agent, or Firm — Patent Capital Group

(57) ABSTRACT

A method, apparatus, computer readable medium, and system that includes receiving an indication identifying a tunnel between a first virtual machine, associated with a first protocol, and a second virtual machine, associated with a second protocol, determining that the first protocol is different than the second protocol, determining at least one translation directive that specifies for translation between the first protocol and the second protocol for the tunnel, and causing establishment of a translator based, at least in part, on the translation directive is disclosed.

18 Claims, 9 Drawing Sheets

ESTABLISHING TRANSLATION FOR VIRTUAL MACHINES IN A NETWORK ENVIRONMENT

TECHNICAL FIELD

This disclosure relates in general to the field of communications and, more particularly, to a system and a method for establishing translation for virtual machines in a network environment.

BACKGROUND

A trend towards virtualization in the information technology (IT) arena is driving the development of many virtualization technologies, such as network virtualization. Network virtualization solutions can consolidate multiple physical networks into one virtual network. They can also logically segment a single physical network into multiple logical networks. Partitions can be added to rapidly scale the network for business needs. Network virtualization represents a new IT paradigm, challenging existing physical network deployment models. Network virtualization offers many benefits, such as expanding the availability of single IT assets to multiple users, managing multiple IT assets as a single resource, providing dedicated virtual networks for applications, etc. This can lead to revenue generation, expense reduction, and customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

At least one example embodiment relates to a method, an apparatus, a system, a computer readable medium, and/or the like, to receive an indication identifying a tunnel between a first virtual machine, associated with a first protocol, and a second virtual machine, associated with a second protocol, determine that the first protocol is different than the second protocol, determine at least one translation directive that specifies for translation between the first protocol and the second protocol for the tunnel, and cause establishment of a translator based, at least in part, on the translation directive.

Example Embodiments

Figure 1:
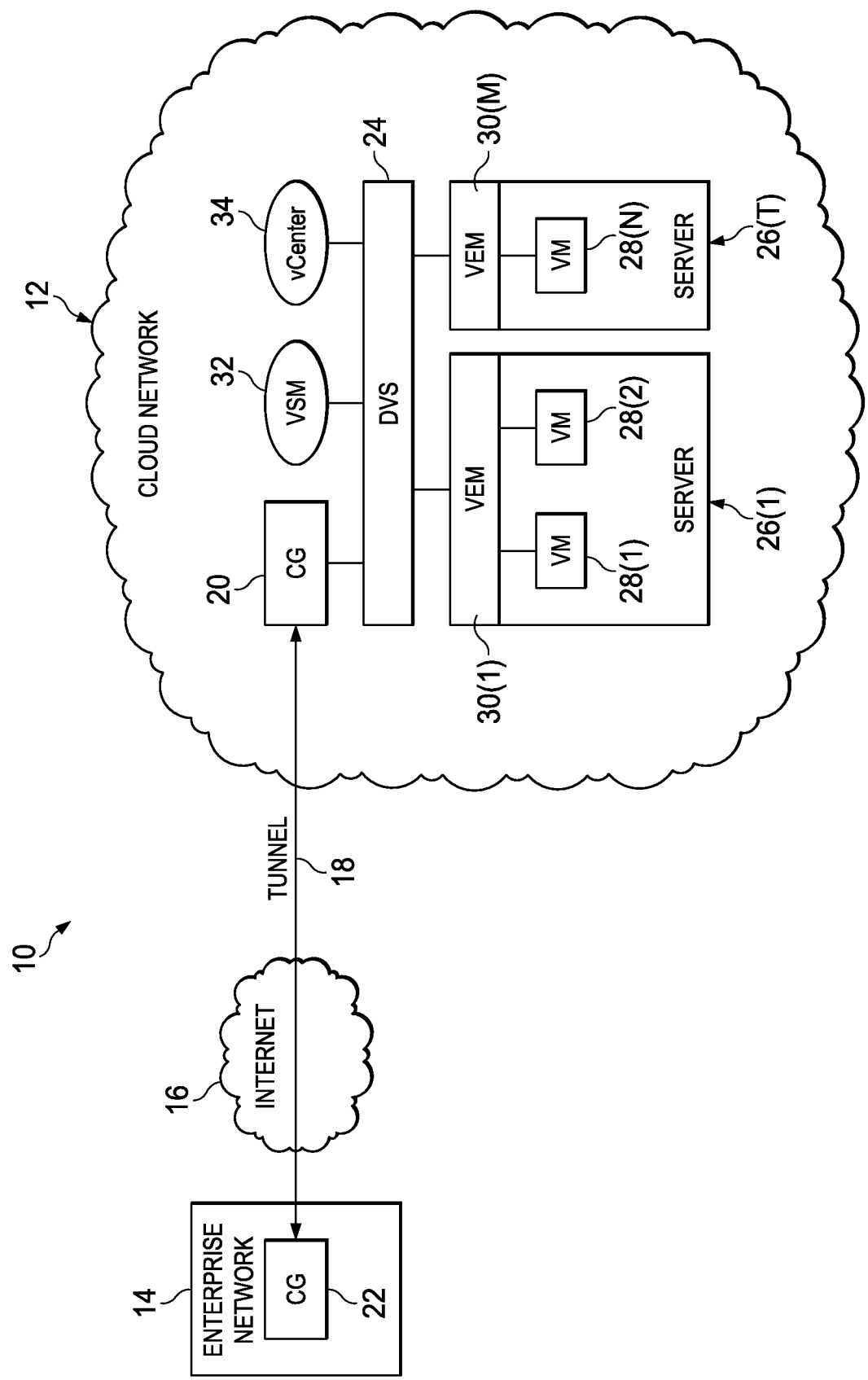
FIG. 1 is a simplified block diagram illustrating a system for migrating application virtual machines in a network environment.

FIG. 1 is a simplified block diagram illustrating a communication system 10 for establishing translation for virtual machines in a network environment in accordance with one example embodiment. FIG. 1 illustrates a cloud network 12 in communication with an enterprise network 14 over a public network, such as an Internet 16, via a tunnel 18. Tunnel 18 may connect a cloud gateway 20 in cloud network 12 with a corresponding cloud gateway 22 in enterprise network 14. Cloud gateway 20 in cloud network 12 may communicate with one or more distributed virtual switches (DVS) 24. DVS 24 may span many servers 26(1)-26(T), functioning as a single virtual switch across associated hosts in cloud network 12. Servers 26(1)-26(T) may host virtual machines (VMs) 28(1)-28(N), enabled by one or more Virtual Ethernet Modules (VEMs) 30(1)-30(M). For example, server 26(1) may be provisioned with VEM 30(1) that provides network capability to VMs 28(1) and 28(2), server 26(T) may be provisioned with VEM 30(M) that provides networking capability to VM 28(N), and/or the like.

DVS 24 may be provisioned with a Virtual Supervisor Module (VSM) 32 that controls VEMs 30(1)-30(M) as one virtual switch. VEMs 30(1)-30(M) may be configured through VSM 32 to perform Layer 2 switching and advanced networking functions, such as port-channels, quality of service (QoS), security (e.g., private virtual local area network (VLAN), port security, etc.), and monitoring (e.g., Netflow, switch port analyzer (SPAN), encapsulated remote SPAN, etc.). Network administrators may have the capability to define configurations on VEMs 30(1)-30(M) in enterprise network 12 from a single interface vCenter 34 coupled to VSM 32. In at least one example embodiment, vCenter 34 is integrated with a server (not shown) that provides a single console to operate and manage VSM 32. Together, DVS 24, VMs 28(1)-28(N), VEMs 30(1)-30(M), VSM 32 and vCenter 34 may form one or more networks.

In at least one example embodiment, cloud network 12 and enterprise network 14 form a hybrid cloud network environment. Enterprise network 14 may be any private network, such as a data center network, operated and controlled by a single entity or organization. In at least one example embodiment, cloud network 12 is a collection of hardware and software ("cloud infrastructure") forming a shared pool of configurable computing resources (e.g., networks, servers, storage, applications, services, etc.) that can be suitably provisioned to provide on-demand self-service, network access, resource pooling, elasticity and measured service, among other features. In at least one example embodiment, cloud network 12 may be deployed as a private cloud (e.g., infrastructure operated by a single enterprise/organization), community cloud (e.g., infrastructure shared by several organizations to support a specific community that has shared concerns), public cloud (e.g., infrastructure made available to the general public), or a suitable combination of two or more disparate types of clouds.

Cloud network 12 may be managed by a cloud service provider, who can provide enterprise network 14 with access to cloud network 14 and authorization to set up tunnel 18 in accordance with a predetermined service level agreement (SLA). In particular, resources (e.g., network, storage, etc.)

within cloud network 12 may not be controlled by the entity or organization controlling enterprise network 14; rather, the resources may be allocated to enterprise network 14 according to the SLA with the cloud service provider. For example, enterprise network 14 may be signed up for using a fixed amount of Central Processing Unit (CPU) processors, storage, and network services. Moreover, cloud network 12 may provide a single operating system (e.g., Linux) across its servers, utilizing a particular hypervisor (e.g., Xen), without regard for compatibility with operating systems or hypervisors of VMs 28(1)-28(N) in enterprise network 14.

DVS 24 may be extended into enterprise network 14 through a VEM residing in enterprise network 14, which may be substantially a counterpart of VEMs 30(1)-30(M) in cloud network 12. Such VEM may be embedded in cloud gateway 22 and may enable switching inter-VM traffic at enterprise network 14. Cloud gateway 22 may facilitate establishing tunnel 18 with allocated cloud resources according to the SLA.

Even though the example of communication 10 depicts network 12 as a cloud network, network 12 may be an enterprise network, or any other type of network. Similarly, even though the example of communication 10 depicts network 14 as an enterprise network, network 14 may be a cloud network, or any other type of network.

For purposes of illustrating the techniques of communication system 10, it is important to understand the communications in a given system such as the system shown in FIG. 1. The following information may be viewed as explanatory information for the purpose of providing clarity. Such information is offered earnestly for purposes of explanation only and, accordingly, should not be construed in any way to limit the broad scope of the present disclosure and its potential applications.

Until recently, data center networks were designed under the assumption that each end node was connected to an access port of a switch in the network and the end node corresponded to one server running a single instance of an operating system (OS) and a single instance of a given application. Another assumption was that the application and its associated OS would be persistently bound to that specific physical server and would rarely, if ever, move onto another physical server. In recent years, introduction of server virtualization has invalidated these assumptions and posed some new challenges for data center network designs. Server virtualization modifies both of the previously mentioned assumptions of data center network design by allowing multiple operating systems to transparently share the same physical server and input/output (I/O) devices. Local switching is used between different VMs within the same server, invalidating the assumption that each network access port corresponds to a single physical server running a single instance of an OS. Moreover, by abstracting hardware from software, virtualization effectively enables VMs to become mobile, which means that a VM can be moved from one physical server to another within the data center or even across multiple data centers or networks, including from within an enterprise network to a cloud extension.

The consequences of such level of mobility on the network are not trivial. Mobility of VMs can pose stringent requirements on the underlying network infrastructure. For example, it could require that both the source and destination hosts be part of the same set of Layer 2 domains (e.g., VLANs). Features such as port security, IEEE 802.1x, and Internet Protocol (IP) source guard that maintain state information based on the physical port may not be deployed in virtualized networks, as the VM may move at any instant. Further, as VMs move from one physical server to another, it may be desirable that the network policies defined in the network for the VM (for example, ACLs) be consistently applied, without regard to the location of the VM in the network.

VEMs, which include virtual interfaces that maintain network configuration attributes, security, and statistics across mobility events, may be dynamically provisioned within virtualized networks based on network policies stored in the DVS as a result of VM provisioning operations by a hypervisor management layer (e.g., vCenter). VEMs could be the virtual equivalent of physical network access ports. VEMs may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with VEMs, transparent mobility of VMs across different physical servers and different physical access-layer switches within an enterprise network may be possible. However, when VMs are moved away from the enterprise network into a cloud extension, operated by an entity different from the entity that operates the enterprise network, certain issues could arise.

Enterprises may subscribe to IT capacity and applications in a cloud to extend the enterprise network based on demand and workload. In the cloud, software applications can be delivered transparently to the user (e.g., the user is effectively unaware of where the processing takes place). Additionally, virtual environments and compute capacity can be delivered as a service when business units require them, without the added cost of purchasing new hardware. Moreover, excess capacity can be easily returned to the pool of resources once it is no longer needed. However, there are at least three hurdles to adoption of cloud computing as an extension of the enterprise network: security, privacy, and compliance.

Moreover, when an enterprise application VM is migrated to the cloud, issues may arise in connection with incompatibility of the hypervisor hosting the VMs in the enterprise versus the hypervisor hosting the VMs in the cloud. For example, the hypervisor (e.g., vMWare™) used in the enterprise network could be different from the hypervisor (e.g., WindRiver™) used in the cloud. Sizeable effort may be needed to convert the VM from one hypervisor format to another, and many times such conversion processes are not reversible. Thus, once the VM is migrated to the cloud, it may not be possible to migrate it back to the enterprise network.

Figure 2:
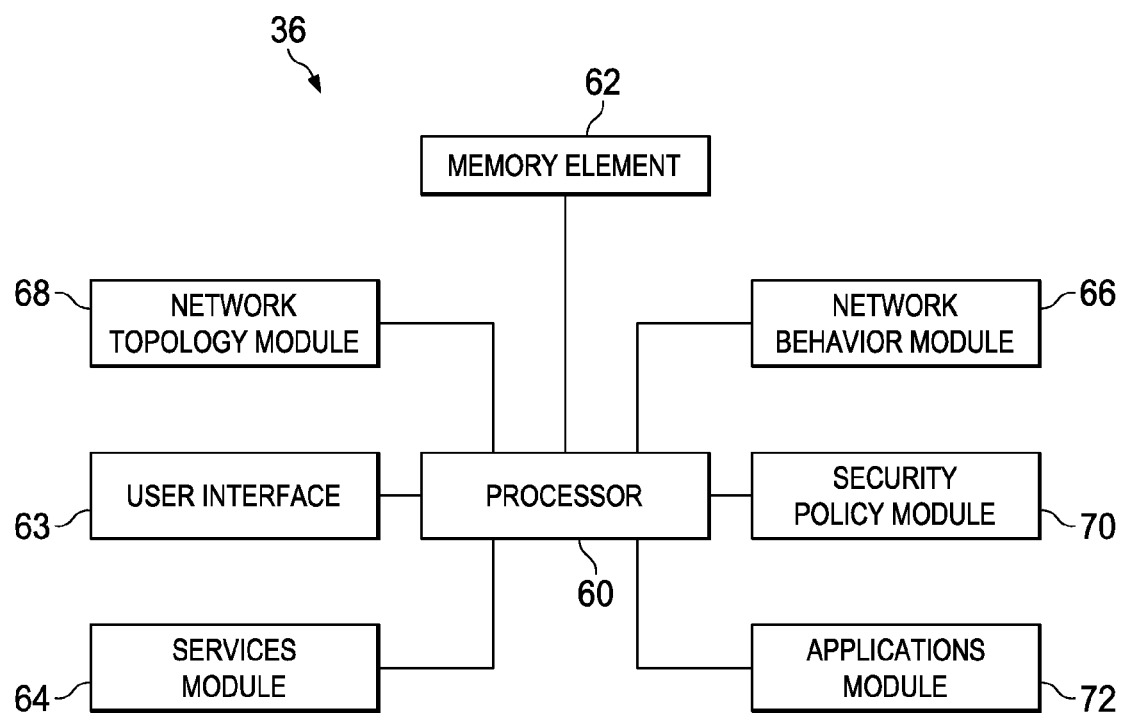
FIG. 2 is a simplified block diagram illustrating example details of the system in accordance with one embodiment.

FIG. 2 is a simplified block diagram illustrating example details of at least one example embodiment of communication system 10. Switch 36 may be a component of cloud manager 30, for example a component that comprises, at least part of, DVS 24 of FIG. 1. In various embodiments, switch 36 may use network resources provided by cloud network 12 to manage network resources.

In the example of FIG. 2, switch 36 includes a processor 60 and a memory element 62. In at least one example embodiment, processor 60 and memory element 62 is part of the infrastructure of cloud network 12. In at least one example embodiment, processor 60 and memory element 62 are dedicated for use exclusively by switch 36. In at least one example embodiment, processor 60 and memory element 62 are one or more processors and memory elements respectively, that are shared between various other components within cloud network 12. In at least one example embodiment, processor 60 represents a virtual central processing unit (vCPU) and memory element 62 represents virtual memory allocated to switch 36 according to resource allocation specifications within cloud network 12.

In at least one example embodiment, switch 36 comprises a user interface 63. User interface 63 may be a suitable GUI or CLI, as appropriate. Switch 36 may comprise various modules, including a services module 64, a network behavior module 66, a network topology module 68, a security policy module 70, and an applications module 72. Switch 36 may appropriately use local virtualization management to provision network resources and manage network behavior.

In at least one example embodiment, virtual machines communicate with each other. For example, one virtual machine may utilize one or more services offered by another virtual machine. In at least one example embodiment, virtual machines communicate with each other by way of tunnels. There are many protocols that a virtual machine may utilize with respect to a tunnel. For example, a virtual machine may utilize VLAN protocol, virtual extensible local area network (VXLAN) protocol, generic routing encapsulation (GRE) protocol, network virtualization using generic routing encapsulation (NVGRE), and/or the like.

Many networks utilize a diverse set of virtual machines. As utilization of virtual machines to satisfy computing needs have proliferated, there has become an increasing availability of various virtual machine implementations that provide many different services. Many networks utilize a multitude of different types of virtual machines. In some circumstances, these diverse virtual machines utilize different protocols. For example, a network administrator may desire to utilize a first virtual machine that utilizes VXLAN, and a second virtual machine that utilizes NVGRE. It may be desirable for the network administrator to be able to deploy these virtual machines without being limited by their reliance on different protocols. For example, it may be desirable to provide a solution to allow for communication between these virtual machines.

As previously described, determining topology of virtual machines in a network can be a very complex and dynamic task. For example, the needs of the users relying on the network may change, environmental factors associated with the network may vary, etc. In many circumstances, topology of the network may be continually changing to adapt to changing requirements and circumstances. Network administrators may modify the network topology by way of migrating virtual machines. In at least one example embodiment, migrating a virtual machine relates to changing placement of the virtual machine within the network topology. For example, a network administrator may remove a virtual machine from one server and place the virtual machine on another server. In at least one example embodiment, placement refers to a position in the network topology where a virtual machine resides. For example, a placement of a virtual machine may be on a specified server. For at least the reason that migration of virtual machines has become a common practice to manage networks, it may be desirable to allow for communication between virtual machines that utilize different protocols in a manner that allows for adaptability as migration of virtual machines occurs.

In at least one example embodiment, an apparatus in a network may utilize flow level programming. In at least one example embodiment, flow level programming relates to programming that utilizes directives associated with management of data flow. For example, flow level programming may allow the path of network packets through the network of switches to be determined by software running on one or more routers. In at least one example embodiment, one or more apparatuses in a network utilize openflow for flow level programming. In at least one example embodiment, an apparatus may utilize a flow level programming directive to manage data flow associated with a virtual machine, associated with a tunnel, and/or the like. In at least one example embodiment, the apparatus may manage data flow by way of flow level programming directives. In at least one example embodiment, a flow level programming directive relates to a command that conveys flow level programming information that causes at least one module to perform an action in compliance with the flow level programming information. For example, a flow level programming directive may relate to configuration of a tunnel, a port, and/or the like. In at least one example embodiment, a flow level programming directive relates to an openflow rule.

FIGS. 3A-3F are diagrams illustrating modules associated with establishing translation for virtual machines in a network environment according to at least one example embodiment. The examples of FIGS. 3A-3F are merely examples of modules associated with establishing translation for virtual machines in a network environment, and do not limit the scope of the claims. For example, operations attributed to a component may vary, number of components may vary, composition of a component may vary, and/or the like. For example, in some example embodiments, operations attributable to one component of the example of FIGS. 3A-3F may be allocated to one or more other components.

As previously described, it may be desirable to provide a solution to allow for communication between virtual machines that utilize different protocols. In at least one example embodiment, an apparatus provides a translator that allows for communication between virtual machines that utilize different protocols. In at least one example embodiment, a translator relates to a module that modifies information, which accords with a protocol, communicated by way of a tunnel such that the information accords with a different protocol. For example, a virtual machine may utilize a protocol, and a different virtual machine may utilize a different protocol. In such an example, a translator may be utilized to modify information sent from the virtual machine to the different virtual machine such that the information is modified from accordance with the protocol to accordance with the different protocol. Accordance with a protocol may relate to information arrangement, communication sequencing, communication management, and/or the like.

In at least one example embodiment, an apparatus may determine that two virtual machines are associated with different protocols. Under such circumstances, the apparatus may determine to provide a translator to facilitate utilization of a tunnel between the virtual machines. Upon such determination, the apparatus may determine a translation directive based on the different protocols. In at least one example embodiment, a translation directive relates to a directive that specifies a translator. Specification of a translator may relate to identifying a segment associated with the translator, a tunnel associated with the translator, a port associated with the translator, placement associated with the translator, identifying a virtual machine associated with the translator, and/or the like. For example, a translation directive may identify a tunnel that connects information being passed from one virtual machine to another virtual machine. In such circumstances, the translation directive may comprise specification of the identity of the virtual machines, a segment identifier for each virtual machine, host information associated with each virtual machine, protocol information associated with the virtual machine, and/or the like.

In at least one example embodiment, a translation directive may be a flow level programming directive, such as an openflow rule. Without limiting the claims in any way, at least one technical advantage associated with utilization of a flow level programming directive is to allow for translation implementation within the constructs of the flow level programming implementation. For example, such flow level directive may be able to utilize an implementation of flow management of the flow level programming, without invocation of any specialized translation software. In this manner, a network administrator may avoid purchasing, storing, invoking, etc. any specialized translation software. Furthermore, such a flow level programming directive allows for addition of support for emerging protocols by way of updating the flow level programming implementation without necessarily changing the flow level programming directives, or any implementation associated with generating flow level programming directives. In this manner, a network administrator may avoid modification of software associated with determining translation directives.

In at least one example embodiment, a module may receive a translation directive. In at least one example embodiment, the module establishes the translator based, at least in part, on the translation directive. For example, the module may invoke operation of flow level programming to establish tunnel characteristics in accordance with the translation directive. In this manner, sending the translation directive to a module may cause establishment of a translator based, at least in part, on the translation directive.

In at least one example embodiment, an apparatus may comprise a translation controller. In at least one example embodiment, a translation controller relates to a module, such as a virtual machine, that evaluates information associated with virtual machines and provides for establishment of at least one translator between at least two virtual machines.

Figure 3A:
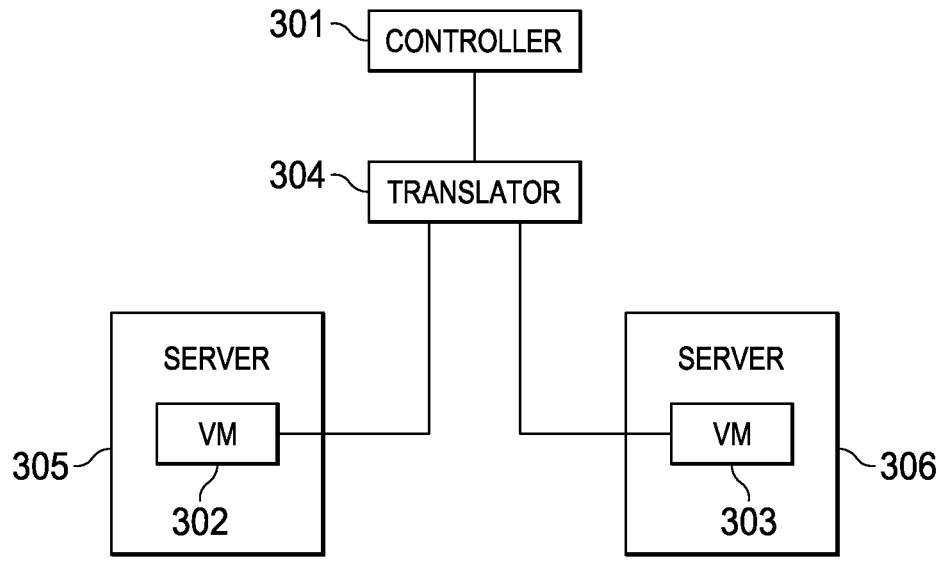
FIGS. 3A-3F are diagrams illustrating modules associated with establishing translation for virtual machines in a network environment according to at least one example embodiment.

FIG. 3A is a diagram illustrating modules associated with establishing translation for virtual machines in a network environment according to at least one example embodiment. In the example of FIG. 3A, translation controller 301 has caused establishment of translator 304. Translator 304 relates to a translator associated with communication between virtual machine 302 and virtual machine 303. In the example of FIG. 3A, virtual machine 302 is comprised by server 305 and virtual machine 303 is comprised by server 306. In at least one example embodiment, translator 304 is a virtual machine.

Translator 304 may be established such that translator 304 complies with a translation directive determined by controller 301. For example, server 305 may be placed on a VXLAN segment having an identifier of 100, and server 306 may be placed on a NVGRE segment having an identifier of 200. In such an example, a directive specifying translator 304 may relate to association of information sent and received by server 305 being compliant with VXLAN and association of information sent and received by server 306 being compliant with NVGRE. In such an example, the directive may relate to a flow level programming directive. For example, if the directive relates to an openflow directive, the directive may be as follows:

Regarding virtual machine 302 sending information:
ovs-ofctl add-flow bridge in_port=A, actions=tunnel, tunnel_id=200,
type=NVGRE \ src_ip=server305, dst_ip=server306, output=B Regarding virtual machine 302 receiving information:
ovs-ofctl add-flow bridge in_port=B, actions=tunnel, tunnel_id=200,
type=NVGRE \ src_ip=server306, dst_ip=server305, output=A Regarding virtual machine 303 sending information:
ovs-ofctl add-flow bridge in_port=A, actions=tunnel, tunnel_id=100,
type=VXLAN \ src_ip=server306, dst_ip=server305, output=B Regarding virtual machine 303 receiving information:
ovs-ofctl add-flow bridge in_port=B, actions=tunnel, tunnel_id=100,
type=VXLAN \ src_ip=server305, dst_ip=server306, output=A In such an example, translator 304 may be performed by openflow rules. In at least one example embodiment, a translator specified by open flow rules performs in entirety by open flow rules.

Figure 3B:
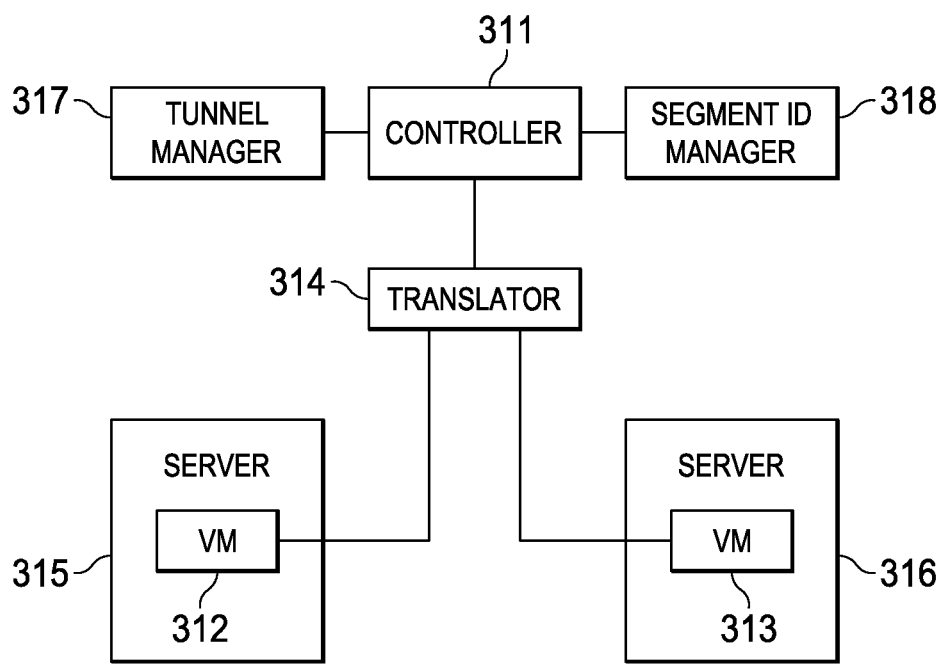

FIG. 3B is a diagram illustrating modules associated with establishing translation for virtual machines in a network environment according to at least one example embodiment. In at least one example embodiment, a translation controller may utilize information received from other modules in determining a translation directive. For example, the translation controller may utilize virtual machine segment information, virtual machine protocol information, virtual machine tunnel information, and/or the like, when determining the translation directive. In such circumstances, the translation controller may receive such information from modules that manage such information, such as a tunnel manager, a segment identification manager (segment ID manager), and/or the like.

In at least one example embodiment, the translation controller receives indication identifying a tunnel between a first virtual machine and a second virtual machine. In at least one example embodiment, the translation controller receives such tunnel information from a tunnel manager. The indication may be received in response to a request for such indication, based on a change in such information, and/or the like. For example, the translation controller may request tunnel information from the tunnel manager.

In at least one example embodiment, the translation controller receives first segment information associated with a protocol associated with a first virtual machine and a second segment information associated with protocol of a second virtual machine. In at least one example embodiment, the translation controller receives such segment information from a segment identification manager. The indication may be received in response to a request for such indication, based on a change in such information, and/or the like. For example, the translation controller may request tunnel information from the segment identification manager.

In the example of FIG. 3B, translation controller 311 has caused establishment of translator 314. Translator 314 relates to a translator associated with communication between virtual machine 312 and virtual machine 313. In the example of FIG. 3B, virtual machine 312 is comprised by server 315 and virtual machine 313 is comprised by server 316. In at least one example embodiment, translator 314 is a virtual machine.

Translator 314 may be established such that translator 314 complies with a translation directive determined by controller 311. Translation controller 311 may receive information indicating a tunnel between virtual machine 312 and virtual machine 313 from tunnel manager 317. Translation controller 311 may receive information from segment identification manager indicating that server 315 is placed on a VLAN segment having an identifier of 400, and that server 316 is placed on a NVGRE segment having an identifier of 200. In such an example, a directive specifying translator 314 may relate to association of information sent and received by server 315 being compliant with VLAN and association of information sent and received by server 316 being compliant with NVGRE. In such an example, the directive may relate to a flow level programming directive. For example, if the directive relates to an openflow directive, the directive may be as follows:

Regarding virtual machine 312 sending information:
ovs-ofctl add-flow bridge in_port=A, actions=tunnel, tunnel_id=200,
type=NVGRE \ src_ip=server315, dst_ip=server316, output=B Regarding virtual machine 312 receiving information:
ovs-ofctl add-flow bridge in_port=B, actions=tunnel, tunnel_id=200,
type=NVGRE \ src_ip=server316, dst_ip=server315, output=A Regarding virtual machine 313 sending information:
ovs-ofctl add-flow bridge in_port=A, actions=tunnel, tunnel_id=400,
type=VLAN \ src_ip=server316, dst_ip=server315, output=B Regarding virtual machine 313 receiving information:
ovs-ofctl add-flow bridge in_port=B, actions=tunnel, tunnel_id=400,
type=VLAN \ src_ip=server315, dst_ip=server316, output=A In such an example, translator 314 may be performed by openflow rules. In at least one example embodiment, a translator specified by open flow rules performs in entirety by open flow rules.

Figure 3C:
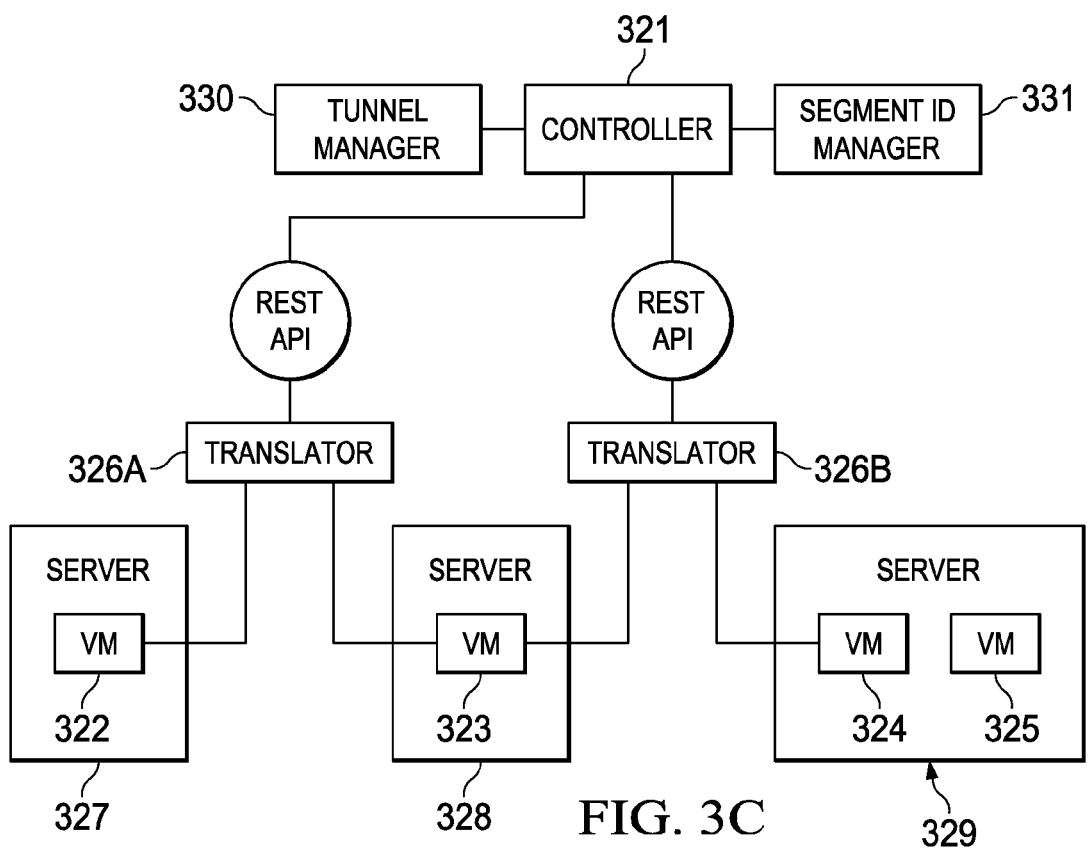

FIG. 3C is a diagram illustrating modules associated with establishing translation for virtual machines in a network environment according to at least one example embodiment. In at least one example embodiment, there is a plurality of translators. The translators may be placed differently within the network topology. In at least one example embodiment, the translation controller may interact with the translator by way of a representational state transfer (REST) API.

In the example of FIG. 3C, translation controller 321 has caused establishment of translator 326A and translator 326B, to which the translation controller interacts by way of a REST API. Translator 326A relates to a translator associated with communication between virtual machine 322 and virtual machine 323. Translator 326B relates to a translator associated with communication between virtual machine 323 and virtual machine 324. In the example of FIG. 3C, server 327 comprises virtual machine 322 and server 328 comprises virtual machine 323. In the example of FIG. 3C, server 329 comprises virtual machine 324 and virtual machine 325. In at least one example embodiment, translator 326A is a virtual machine. In at least one example embodiment, translator 326B is a virtual machine.

Translator 326A may be established such that translator 326A complies with a translation directive determined by controller 321. Translator 326B may be established such that translator 326B complies with a different translation directive determined by controller 321. Translation controller 321 may receive information indicating a tunnel between virtual machine 322 and virtual machine 323 from tunnel manager 330. Translation controller 321 may receive information indicating a tunnel between virtual machine 323 and virtual machine 324 from tunnel manager 330.

Translation controller 321 may receive information from segment identification manager indicating that server 327 is placed on a VLAN segment having an identifier of 400, and that server 328 is placed on a NVGRE segment having an identifier of 200. In such an example, a directive specifying translator 326 may relate to association of information sent and received by server 327 being compliant with VLAN and association of information sent and received by server 328 being compliant with NVGRE. In such an example, the directive associated with translator 326 may relate to a flow level programming directive. For example, if the directive associated with translator 326A relates to an openflow directive, the directive may be as follows:

Regarding virtual machine 322 sending information:
ovs-ofctl add-flow bridge in_port=A, actions=tunnel, tunnel_id=200,
type=NVGRE \ src_ip=server327, dst_ip=server328, output=B Regarding virtual machine 322 receiving information:
ovs-ofctl add-flow bridge in_port=B, actions=tunnel, tunnel_id=200,
type=NVGRE \ src_ip=server328, dst_ip=server327, output=A Regarding virtual machine 323 sending information:
ovs-ofctl add-flow bridge in_port=A, actions=tunnel, tunnel_id=400,
type=VLAN \ src_ip=server328, dst_ip=server327, output=B Regarding virtual machine 323 receiving information:
ovs-ofctl add-flow bridge in_port=B, actions=tunnel, tunnel_id=400,
type=VLAN \ src_ip=server327, dst_ip=server328, output=A In such an example, translator 326A may be performed by openflow rules. In at least one example embodiment, a translator specified by open flow rules performs in entirety by open flow rules.

Translation controller 321 may receive information from segment identification manager indicating that server 329 is placed on a VXLAN segment having an identifier of 300. In such an example, a directive specifying translator 326B may relate to association of information sent and received by server 329 being compliant with VXLAN. In such an example, the directive associated with translator 326B may relate to a flow level programming directive. For example, if the directive associated with translator 326B relates to an openflow directive, the directive may be as follows:

Regarding virtual machine 324 sending information:
ovs-ofctl add-flow bridge in_port=A, actions=tunnel, tunnel_id=200,
type=NVGRE \ src_ip=server329, dst_ip=server328, output=B Regarding virtual machine 324 receiving information:
ovs-ofctl add-flow bridge in_port=B, actions=tunnel, tunnel_id=200,
type=NVGRE \ src_ip=server328, dst_ip=server329, output=A Regarding virtual machine 323 sending information:
ovs-ofctl add-flow bridge in_port=A, actions=tunnel, tunnel_id=300,
type=VXLAN \ src_ip=server328, dst_ip=server329, output=B Regarding virtual machine 323 receiving information:
ovs-ofctl add-flow bridge in_port=B, actions=tunnel, tunnel_id=300,
type=VXLAN \ src_ip=server329, dst_ip=server328, output=A In such an example, translator 326B may be performed by openflow rules. In at least one example embodiment, a translator specified by open flow rules performs in entirety by open flow rules.

In at least one example embodiment, the translation controller determines a placement of the translator. In at least one example embodiment, placement relates to a module in which the translator is established. For example, the placement may relate to placement of the translator on a designated server, on a designated hypervisor, and/or the like. In at least one example embodiment, placement is determined based, at least in part, on topology information. In at least one example embodiment, topology information relates to information indicating placement of modules within a network. For example, topology information may indicate in which server a virtual machine is placed, physical arrangement of network resources, availability of network resources, and/or the like. In at least one example embodiment, the translation controller receives an indication of topology information from a network topology module, such as network topology module 68 of FIG. 2. The indication may be received in response to a request for such indication, based on a change in such information, and/or the like. For example, the translation controller may request topology information from the network topology module. In another example, the network topology module may provide information indicating that topology information associated with at least one virtual machine has changed.

In at least one embodiment, causation of establishment of the translator is based, at least in part, on the placement. For example, the translation controller may cause establishment of the translator based on the placement by sending the translation directive to a module in which the translator is to be placed. In another example, the translation directive comprises information indicating placement, and the module that receives the translation directive establishes the translator in conformance with the placement information.

Figure 3D:
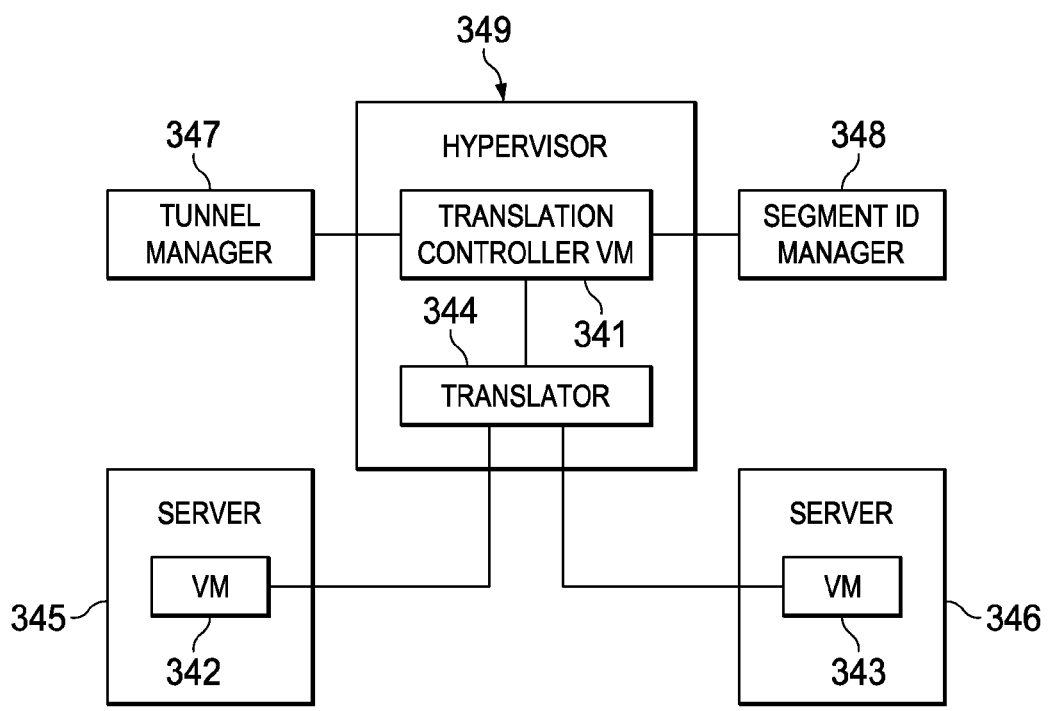

FIG. 3D is a diagram illustrating modules associated with establishing translation for virtual machines in a network environment according to at least one example embodiment. In at least one example embodiment, a translation controller determines placement of a translator to be within a hypervisor. In such an embodiment, the translation controller may cause establishment of the translator by sending a translation directive to the hypervisor. In at least one example embodiment, the hypervisor establishes the translator based, at least in part, on receipt of the translation directive. In this manner, the translation directive may be configured to cause the hypervisor to establish the translator within the hypervisor based, at least in part, on the translation directive In the example of FIG. 3D, translation controller 341 has caused establishment of translator 344. Translator 344 relates to a translator associated with communication between virtual machine 342 and virtual machine 343. In the example of FIG. 3D, virtual machine 342 is comprised by server 345 and virtual machine 343 is comprised by server 346. In at least one example embodiment, translator 344 is a virtual machine. Even though, in the example of FIG. 3D, translation controller 341 is placed within hypervisor 349, in other examples, translation controller may be placed elsewhere. In the example of FIG. 3D, translator 344 is placed within hypervisor 349.

Hypervisor 349 may establish translator 344 such that translator 344 complies with a translation directive determined by controller 341. Translation controller 341 may receive information indicating a tunnel between virtual machine 342 and virtual machine 343 from tunnel manager 347. Translation controller 341 may receive information from segment identification manager indicating that server 345 is placed on a VLAN segment having an identifier of 400, and that server 346 is placed on a NVGRE segment having an identifier of 100. In such an example, a directive specifying translator 344 may relate to association of information sent and received by server 345 being compliant with VLAN and association of information sent and received by server 346 being compliant with NVGRE. In such an example, the directive may relate to a flow level programming directive. For example, if the directive relates to an openflow directive, the directive may be as follows:

Regarding virtual machine 342 sending information:
  ovs-ofctl add-flow bridge in_port=A, actions=tunnel, tunnel_id=100,
  type=NVGRE \ src_ip=server345, dst_ip=server346, output=B
Regarding virtual machine 342 receiving information:
  ovs-ofctl add-flow bridge in_port=B, actions=tunnel, tunnel_id=100,
  type=NVGRE \ src_ip=server346, dst_ip=server345, output=A
Regarding virtual machine 343 sending information:
  ovs-ofctl add-flow bridge in_port=A, actions=tunnel, tunnel_id=400,
  type=VLAN \ src_ip=server346, dst_ip=server345, output=B
Regarding virtual machine 343 receiving information:
  ovs-ofctl add-flow bridge in_port=B, actions=tunnel, tunnel_id=400,
  type=VLAN \ src_ip=server345, dst_ip=server346, output=A In such an example, translation controller 341 may determine placement of translator 344 to be in hypervisor 349, and send the translation directive to hypervisor 349 to cause hypervisor 349 to establish translator 244 in conformance with the translation directive. In such an example, translator 344 may be performed by openflow rules. In at least one example embodiment, a translator specified by open flow rules performs in entirety by open flow rules.

Figure 3E:
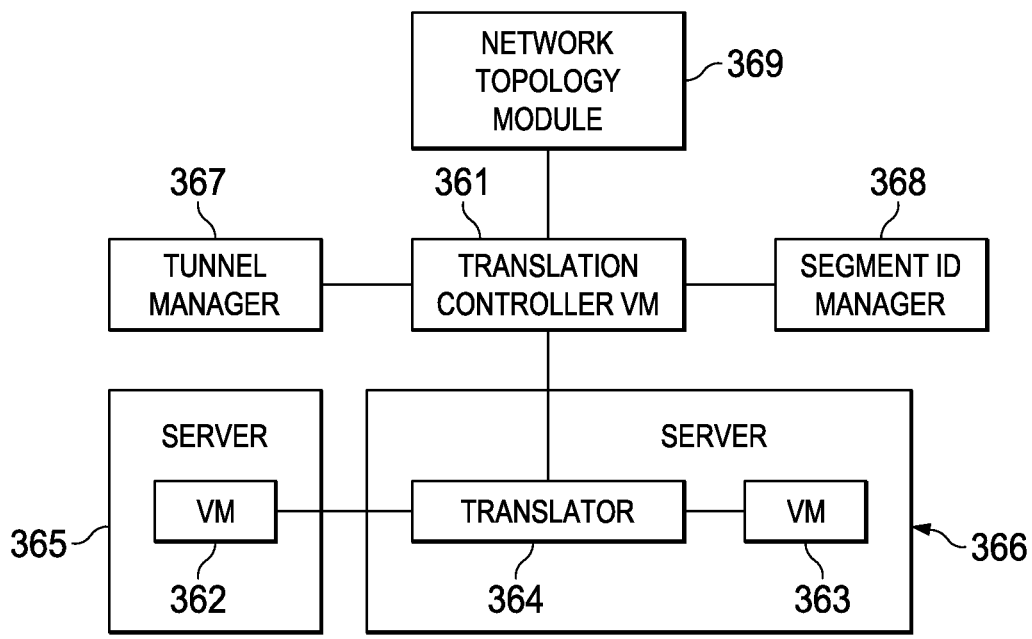

FIG. 3E is a diagram illustrating modules associated with establishing translation for virtual machines in a network environment according to at least one example embodiment. In at least one example embodiment, a translation controller determines placement of a translator to be within a server. In such an embodiment, the translation controller may cause establishment of the translator by sending a translation directive to the server. In at least one example embodiment, the server establishes the translator based, at least in part, on receipt of the translation directive. In this manner, the translation directive may be configured to cause the server to establish the translator within the server based, at least in part, on the translation directive In the example of FIG. 3E, translation controller 361 has caused establishment of translator 364. Translator 364 relates to a translator associated with communication between virtual machine 362 and virtual machine 363. In the example of FIG. 3E, virtual machine 362 is comprised by server 365 and virtual machine 363 is comprised by server 366. In at least one example embodiment, translator 364 is a virtual machine.

Server 366 may establish translator 364 such that translator 364 complies with a translation directive determined by controller 361. Translation controller 361 may receive information indicating a tunnel between virtual machine 362 and virtual machine 363 from tunnel manager 367. Translation controller 361 may receive information from segment identification manager indicating that server 365 is placed on a VLAN segment having an identifier of 200, and that server 366 is placed on a VXLAN segment having an identifier of 100. In such an example, a directive specifying translator 364 may relate to association of information sent and received by server 365 being compliant with VLAN and association of information sent and received by server 366 being compliant with VXLAN. In such an example, the directive may relate to a flow level programming directive. For example, if the directive relates to an openflow directive, the directive may be as follows:

Regarding virtual machine 362 sending information:
ovs-ofctl add-flow bridge in_port=A, actions=tunnel, tunnel_id=100,
type=VXLAN \ src_ip=server365, dst_ip=server366, output=B Regarding virtual machine 362 receiving information:
ovs-ofctl add-flow bridge in_port=B, actions=tunnel, tunnel_id=100,
type=VXLAN \ src_ip=server366, dst_ip=server365, output=A Regarding virtual machine 363 sending information:
ovs-ofctl add-flow bridge in_port=A, actions=tunnel, tunnel_id=200,
type=VLAN \ src_ip=server366, dst_ip=server365, output=B Regarding virtual machine 363 receiving information:
ovs-ofctl add-flow bridge in_port=B, actions=tunnel, tunnel_id=200,
type=VLAN \ src_ip=server365, dst_ip=server366, output=A In the example of FIG. 3E, translation controller 361 receives topology information from network topology module 369. Translation controller may determine placement of translator 364 to be in server 366 based, at least in part, on the topology information, the tunnel information, the segment information, and/or the like. Translation controller 361 may send the translation directive to server 366 to cause server 366 to establish translator 264 in conformance with the translation directive. In such an example, translator 364 may be performed by openflow rules. In at least one example embodiment, a translator specified by open flow rules performs in entirety by open flow rules.

Figure 3F:
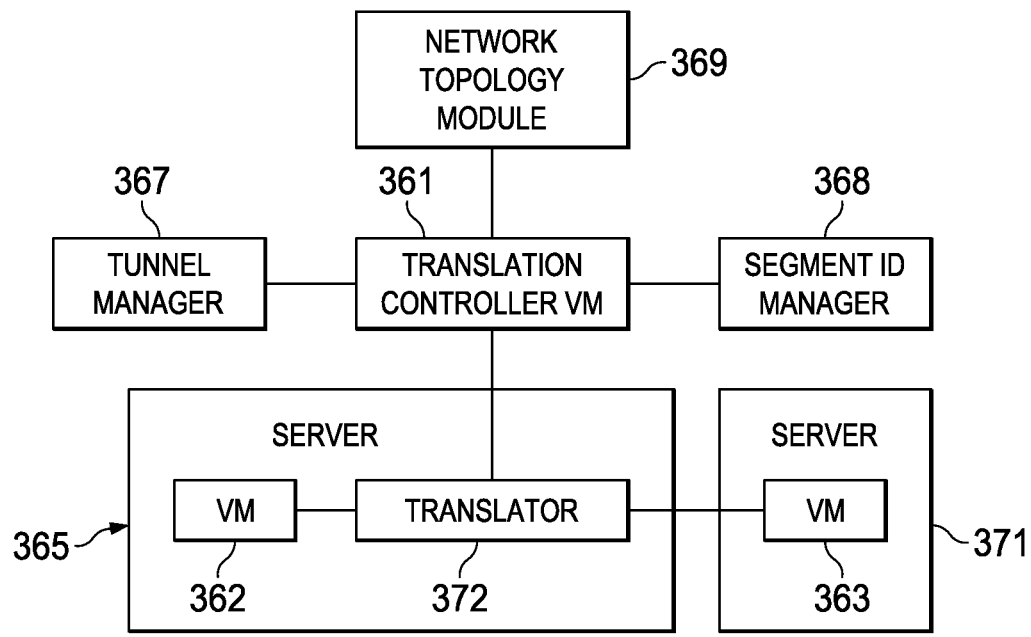

FIG. 3F is a diagram illustrating modules associated with establishing translation for virtual machines in a network environment according to at least one example embodiment. In at least one example embodiment, a translation controller receives changed topology information indicative of migration of at least one of the virtual machines associated with a translator. For example, the translation controller may receive an indication of the changed topology from a network topology module. In such circumstances, the translation controller may determine a different placement for the translator based, at least in part, on the changed topology information. For example, the virtual machine may have previously been placed on the same server as the translator. In such an example, it may be inefficient for the translator to remain placed on the server. Therefore, the translation controller may determine a different placement for the translator based on the changed topology information.

The example of FIG. 3F relates to the example of FIG. 3E after virtual machine 363 has been migrated from server 366 to server 371. Translation controller 361 may receive an indication, from network topology module 369, indicating changed topology information. Translation controller may determine a different placement for a translator based, at least in part, on the changed topology information. In the example of FIG. 3F, translation controller 361 determines placement of the translator to be in server 365. Translation controller 361 may determine a different translation directive that reflects the changed topology of virtual machine 363, and may cause establishment of translator 372 in accordance with the different translation directive. Translation controller 361 may cause establishment of translator 372 by sending the different translation directive to server 365. Since translator 372 now handles translation between virtual machine 362 and virtual machine 363, there may no longer be a purpose to retain translator 364. Therefore, translation controller 361 may cause disestablishment of translator 364. In at least one example embodiment, disestablishment relates to removal of a virtual machine, such as a translator virtual machine. The translation controller may cause disestablishment of a translator by way of sending a directive indicative of disestablishment, such a command to remove the translator.

Figure 4:
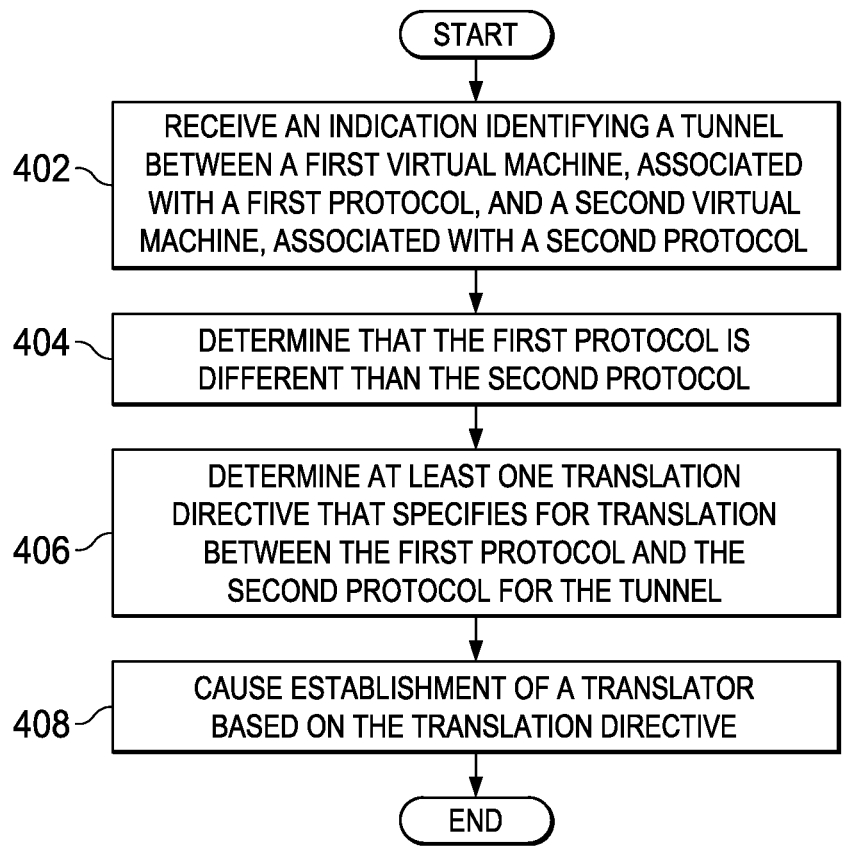
FIG. 4 is a flow diagram illustrating activities associated with establishing translation for virtual machines according to at least one example embodiment.

FIG. 4 is a flow diagram illustrating activities associated with establishing translation for virtual machines according to at least one example embodiment. In at least one example embodiment, there is a set of operations that corresponds the activities of FIG. 4. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 4.

At block 402, the apparatus receives an indication identifying a tunnel between a first virtual machine, associated with a first protocol, and a second virtual machine, associated with a second protocol. The receipt, the indication, the tunnel, the virtual machines, the protocols, and the association between the virtual machines and the protocols may be similar as described regarding FIGS. 3A-3F.

At block 404, the apparatus determines that the first protocol is different than the second protocol. The apparatus may determine the difference by way of comparing the first protocol to the second protocol. In at least one example embodiment, the apparatus determines existence of a difference between protocols if there may be any communication incompatibility between the protocols which may be addressed by way of translation. For example, if there is a difference between protocols that is not relevant to translation, the apparatus may determine that the protocols are not different. In another example, if there is, even a minor, difference between the protocols that may be resolved by way of translation, the apparatus may determine that the protocols are different.

At block 406, the apparatus determines at least one translation directive that specifies for translation between the first protocol and the second protocol for the tunnel. The determination, the translation directive, and the tunnel may be similar as described regarding FIGS. 3A-3F.

At block 408, the apparatus causes establishment of a translator based, at least in part, on the translation directive. The causation, establishment, and the translator may be similar as described regarding FIGS. 3A-3F.

Figure 5:
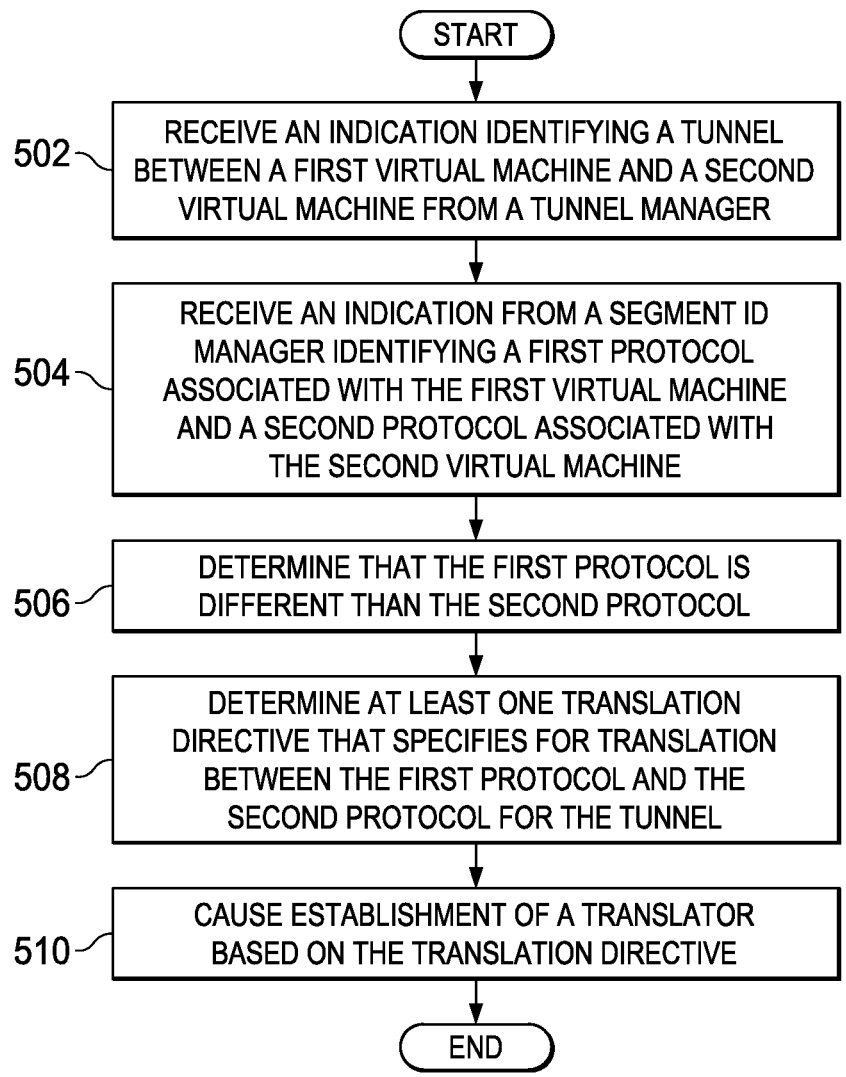
FIG. 5 is a flow diagram illustrating activities associated with establishing translation for virtual machines according to at least one example embodiment.

FIG. 5 is a flow diagram illustrating activities associated with establishing translation for virtual machines according to at least one example embodiment. In at least one example embodiment, there is a set of operations that corresponds the activities of FIG. 5. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 5.

At block 502, the apparatus receives an indication identifying a tunnel between a first virtual machine and a second virtual machine from a tunnel manager. The receipt, the indication, the tunnel, the virtual machines, and the tunnel manager may be similar as described regarding FIGS. 3A-3F.

At block 504, the apparatus receives an indication, from a segment identification manager, identifying a first protocol associated with the first virtual machine and a second protocol associated with the second virtual machine. The receipt, the indication, the segment identification manager, and the protocols may be similar as described regarding FIGS. 3A-3F.

At block 506, the apparatus determines that the first protocol is different than the second protocol, similarly as described regarding block 404 of FIG. 4. At block 508, the apparatus determines at least one translation directive that specifies for translation between the first protocol and the second protocol for the tunnel, similarly as described regarding block 406 of FIG. 4. At block 510, the apparatus causes establishment of a translator based, at least in part, on the translation directive, similarly as described regarding block 408 of FIG. 4.

Figure 6:
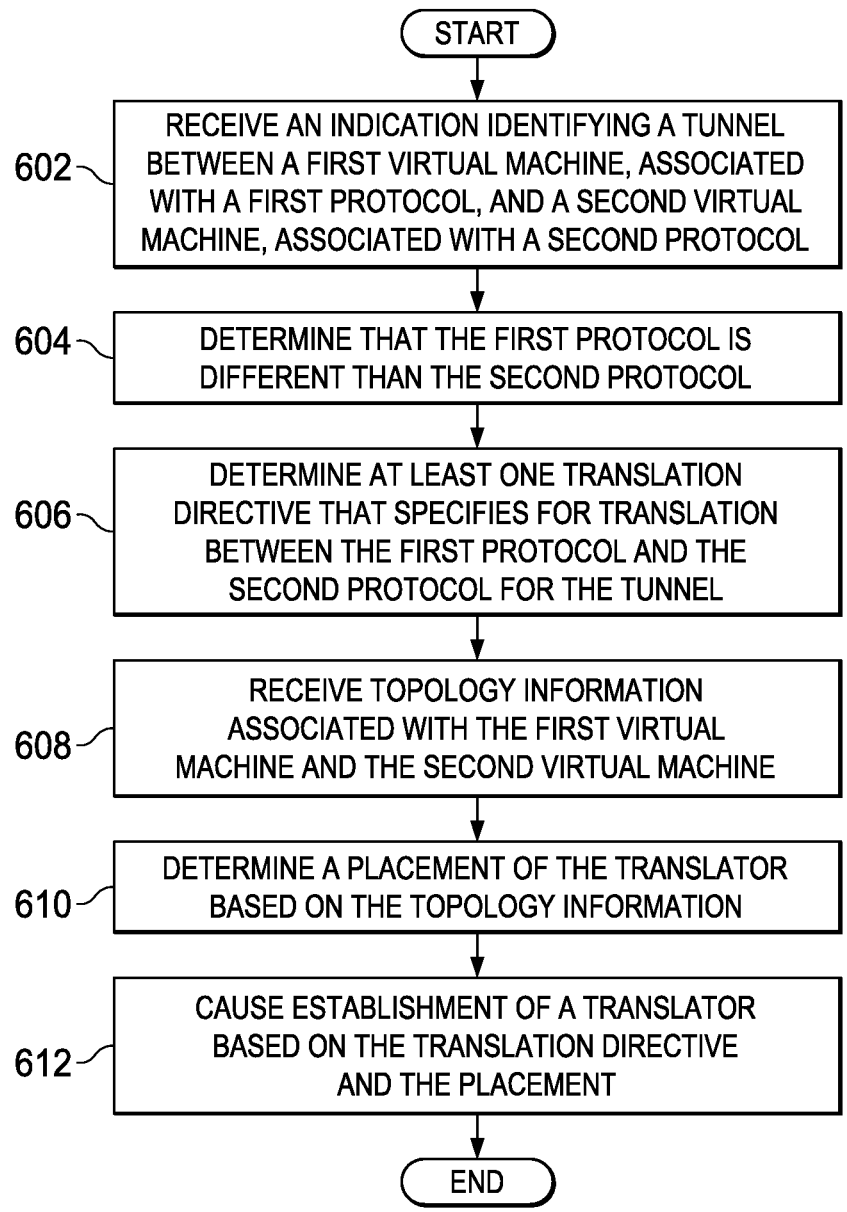
FIG. 6 is a flow diagram illustrating activities associated with establishing translation for virtual machines according to at least one example embodiment.

FIG. 6 is a flow diagram illustrating activities associated with establishing translation for virtual machines according to at least one example embodiment. In at least one example embodiment, there is a set of operations that corresponds the activities of FIG. 6. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 6.

At block 602, the apparatus receives an indication identifying a tunnel between a first virtual machine, associated with a first protocol, and a second virtual machine, associated with a second protocol, similarly as described regarding block 402 of FIG. 4. At block 604, the apparatus determines that the first protocol is different than the second protocol, similarly as described regarding block 404 of FIG. 4. At block 606, the apparatus determines at least one translation directive that specifies for translation between the first protocol and the second protocol for the tunnel, similarly as described regarding block 406 of FIG. 4.

At block 608, the apparatus receives topology information associated with the first virtual machine and the second virtual machine. The receipt and the topology information may be similar as described regarding FIGS. 3A-3F.

At block 610, the apparatus determines a placement of the translator based, at least in part, on the topology information. The determination and the placement may be similar as described regarding FIGS. 3A-3F.

At block 612, the apparatus causes establishment of the translator is based, at least in part, on the placement. The causation and the establishment may be similar as described regarding FIGS. 3A-3F.

Figure 7:
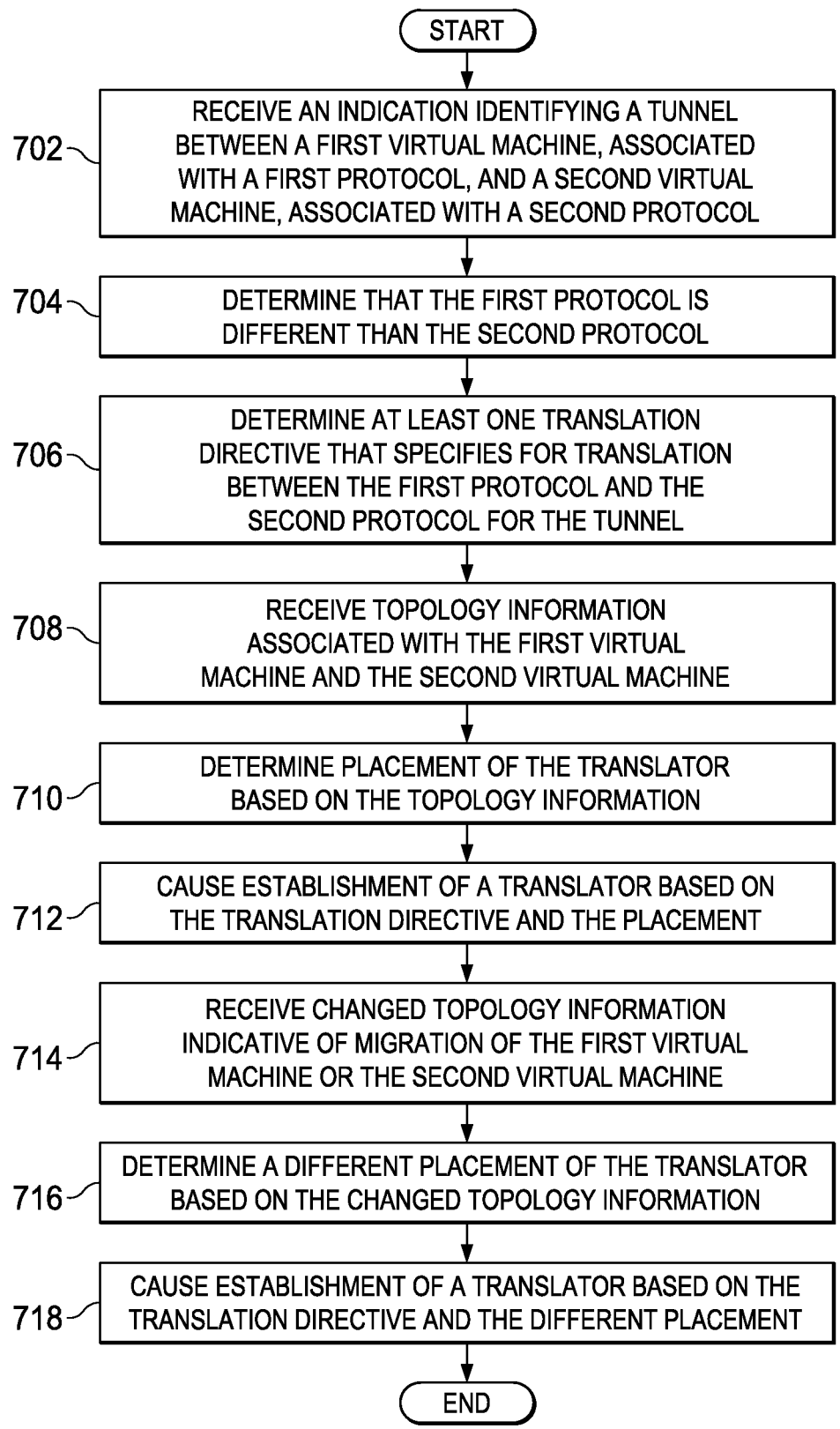
FIG. 7 is a flow diagram illustrating activities associated with establishing translation for virtual machines according to at least one example embodiment.

FIG. 7 is a flow diagram illustrating activities associated with establishing translation for virtual machines according to at least one example embodiment. In at least one example embodiment, there is a set of operations that corresponds the activities of FIG. 7. An apparatus, for example switch 36 of FIG. 2, or a portion thereof, may utilize the set of operations. The apparatus may comprise means, including, for example processor 60 of FIG. 2, for performance of such operations. In an example embodiment, an apparatus, for example switch 36 of FIG. 2, is transformed by having memory, for example memory element 62 of FIG. 2, comprising computer code configured to, working with a processor, for example processor 60 of FIG. 2, cause the apparatus to perform set of operations of FIG. 7.

At block 702, the apparatus receives an indication identifying a tunnel between a first virtual machine, associated with a first protocol, and a second virtual machine, associated with a second protocol, similarly as described regarding block 402 of FIG. 4. At block 704, the apparatus determines that the first protocol is different than the second protocol, similarly as described regarding block 404 of FIG. 4. At block 706, the apparatus determines at least one translation directive that specifies for translation between the first protocol and the second protocol for the tunnel, similarly as described regarding block 406 of FIG. 4. At block 708, the apparatus receives topology information associated with the first virtual machine and the second virtual machine, similarly as described regarding block 608 of FIG. 6. At block 710, the apparatus determines a placement of the translator based, at least in part, on the topology information similarly as described regarding block 610 of FIG. 6. At block 712, the apparatus causes establishment of the translator is based, at least in part, on the placement, similarly as described regarding block 612 of FIG. 6.

At block 714, the apparatus receives changed topology information indicative of migration of at least one of the first virtual machine or the second virtual machine. The receipt, the changed topology information, and the migration may be similar as described regarding FIGS. 3A-3F.

At block 716, the apparatus determines a different placement of the translator based, at least in part, on the changed topology information. The determination and the different placement may be similar as described regarding FIGS. 3A-3F.

At block 718, the apparatus causes establishment of a different translator based, at least in part, on the translation directive. The causation, the establishment, and the different translator may be similar as described regarding FIGS. 3A-3F.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, switch 36. In some embodiments, one or more of these features may be implemented in hardware, provided external to these elements, or consolidated in any appropriate manner to achieve the intended functionality. The various network elements (e.g., switch 36, cloud gateways 20, 22, and DVS 24) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 49) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 60) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 62) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EE-PROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. An apparatus, comprising:
at least one processor; and
at least one memory, the at least one memory comprising computer code that, when executed by the at least one processor, causes the apparatus to:

receive an indication identifying a tunnel between a first virtual machine, associated with a first protocol, and second virtual machine, associated with a second protocol;

determine that the first protocol is different than the second protocol;

determine at least one translation directive that specifies for translation between the first protocol and the second protocol for the tunnel;

receive topology information associated with the first virtual machine and the second virtual machine;

determine a network location at which to place a translator based, at least in part, on the topology information;

create the translator based, at least in part, on the at least one translation directive, the translator being placed at the network location;

determine a different network location at which to place the translator based, at least in part, on the topology information being changed;

create a new translator based, at least in part, on the at least one translation directive, the new translator being placed at the different network location; and remove the translator from the network location, wherein each of the translator and the new translator facilitates the first virtual machine and the second virtual machine being deployed as an extension of a network though the first virtual machine and the second virtual machine are located on different servers, and wherein each of the translator and the new translator translates data between the first protocol and the second protocol over the tunnel between the first virtual machine and the second virtual machine.

2. The apparatus of claim 1, wherein the determination that the first protocol is different than the second protocol is based, at least in part, on a first segment information associated with the first protocol and a second segment information associated with the second protocol.

3. The apparatus of claim 1, wherein the at least one translation directive relates to a flow level programming directive.

4. The apparatus of claim 3, wherein the flow level programming directive is an openflow rule.

5. At least one non-transitory computer readable medium comprising computer code that, when executed by a processor, causes an apparatus to:

receive an indication identifying a tunnel between a first virtual machine, associated with a first protocol, and a second virtual machine, associated with a second protocol;

determine that the first protocol is different than the second protocol;

determine at least one translation directive that specifies for translation between the first protocol and the second protocol for the tunnel;

receive topology information associated with the first virtual machine and the second virtual machine;

determine a network location at which to place a translator based, at least in part, on the topology information;

create the translator based, at least in part, on the at least one translation directive, the translator being placed at the network location;

determine a different network location at which to place the translator based, at least in part, on the topology information being changed;

create a new translator based, at least in part, on the at least one translation directive, the new translator being placed at the different network location; and remove the translator from the network location, wherein each of the translator and the new translator facilitates the first virtual machine and the second virtual machine being deployed as an extension of a network though the first virtual machine and the second virtual machine are located on different servers, and wherein each of the translator and the new translator translates data between the first protocol and the second protocol over the tunnel between the first virtual machine and the second virtual machine.

6. The at least one non-transitory computer readable medium of claim 5, wherein the determination that the first protocol is different than the second protocol is based, at least in part, on a first segment information associated with the first protocol and a second segment information associated with the second protocol.

7. The at least one non-transitory computer readable medium of claim 5, wherein the at least one translation directive relates to a flow level programming directive.

8. The at least one non-transitory computer readable medium of claim 7, wherein the flow level programming directive is an openflow rule.

9. A method comprising:

receiving an indication identifying between a first virtual machine, associated with a first protocol, and a second virtual machine, associated with a second protocol;

determining that the first protocol is different than the second protocol;

determining at least one translation directive that specifies for translation between the first protocol and the second protocol for the tunnel;

receive topology information associated with the first virtual machine and the second virtual machine;

determine a network location at which to place a translator based, at least in part, on the topology information; and create an instance of the translator based, at least in part, on the at least one translation directive, the translator being placed at the network location;

determine a different network location at which to place the translator based, at least in part, on the topology information being changed;

create a new translator based, at least in part, on the at least one translation directive, the new translator being placed at the different network location; and remove the translator from the network location, wherein each of the translator and the new translator facilitates the first virtual machine and the second virtual machine being deployed as an extension of a network though the first virtual machine and the second virtual machine are located on different servers, and wherein each of the translator and the new translator translates data between the first protocol and the second protocol over the tunnel between the first virtual machine and the second virtual machine.

10. The method of claim 9, wherein the determination that the first protocol is different than the second protocol is based, at least in part, on a first segment information associated with the first protocol and a second segment information associated with the second protocol.

11. The method of claim 9, wherein the at least one translation directive relates to a flow level programming directive.

12. The method of claim 11, wherein the flow level programming directive is an openflow rule.

13. The apparatus of claim 1, wherein the creating the translator comprises: the at least one memory further comprising computer code that, when executed by the at least one processor, causes the apparatus to:
transmit to a server located at the network location instructions to generate, on the server, a virtual machine corresponding to the translator.

14. The at least one non-transitory computer readable medium of claim 5, wherein the creating the translator comprises computer code that, when executed by the processor, causes the apparatus to:
transmit to a server located at the network location instructions to generate, on the server, a virtual machine corresponding to the translator.

15. The method of claim 9, wherein the creating the translator comprises:
transmitting to a server located at the network location instructions to generate, on the server, a virtual machine corresponding to the translator.

16. The apparatus of claim 1, wherein the creating the new translator comprises: the at least one memory further comprising computer code that, when executed by the at least one processor, causes the apparatus to:
transmit to a server located at the different network location instructions to generate, on the server, a virtual machine corresponding to the new translator.

17. The at least one non-transitory computer readable medium of claim 5, wherein the creating the new translator comprises computer code that, when executed by the processor, causes the apparatus to:
transmit to a server located at the different network location instructions to generate, on the server, a virtual machine corresponding to the new translator.

18. The apparatus of claim 1, wherein the creating the new translator and the removing the translator is to replace the translator with the new translator as an active translator of data between the first protocol and the second protocol over the tunnel between the first virtual machine and the second virtual machine.

* * * * *

UNITED STATES PATENT AND TRADEMARK OFFICE
CERTIFICATE OF CORRECTION

PATENT NO. : 9,680,968 B2
APPLICATION NO. : 13/830861
DATED : June 13, 2017
INVENTOR(S) : Debojyoti Dutta et al.

Page 1 of 1

It is certified that error appears in the above-identified patent and that said Letters Patent is hereby corrected as shown below:

In item (73) Assignee, please change "PATENT CAPITAL GROUP" to -- CISCO TECHNOLOGY, INC. --

Signed and Sealed this
Twenty-seventh Day of November, 2018

Andrei Iancu
*Director of the United States Patent and Trademark Office*